US008713088B2

(12) United States Patent
Gopshtein et al.

(10) Patent No.: US 8,713,088 B2

(45) Date of Patent: Apr. 29, 2014

(54) IDENTIFYING USERS OF REMOTE SESSIONS

(75) Inventors: Michael Gopshtein, Yahund (IL); Eyal Kenigsberg, Dolev (IL); Nick Ioffe, Bat Yam (IL); Rotem Steuer, Modin (IL); Sergey Pastukhov, Odessa (UA)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 13/072,724

(22) Filed: Mar. 27, 2011

(65) Prior Publication Data

US 2012/0246215 A1 Sep. 27, 2012

(51) Int. Cl.
*G06F 15/16* (2006.01)

(52) U.S. Cl.
USPC .......................................... 709/202; 709/203

(58) Field of Classification Search
USPC ................................................. 709/202, 203
See application file for complete search history.

(56) References Cited

U.S. PATENT DOCUMENTS 5,774,660 A 6/1998 Brendel et al.
6,249,811 B1 6/2001 Kido
7,962,545 B2 * 6/2011 Knauerhase et al. .......... 709/203
7,996,414 B2 * 8/2011 Alpern et al. ................ 707/758
8,229,969 B1 * 7/2012 Floyd ........................... 707/802
8,527,982 B1 * 9/2013 Sapuntzakis et al. ......... 717/174
8,533,343 B1 * 9/2013 Beda et al. .................... 709/227
2002/0147856 A1 * 10/2002 Sarkar et al. .................. 709/313
2003/0145224 A1 * 7/2003 Bailey .......................... 713/201
2004/0128670 A1 * 7/2004 Robinson et al. ................. 718/1
2005/0055588 A1 * 3/2005 Nalawadi et al. ............. 713/300
2006/0136912 A1 * 6/2006 Robinson et al. ................. 718/1
2007/0271561 A1 * 11/2007 Winner et al. ................... 718/1
2008/0034413 A1 * 2/2008 He et al. ........................... 726/9
2008/0307414 A1 * 12/2008 Alpern et al. ..................... 718/1
2010/0107163 A1 * 4/2010 Lee .................................. 718/1
2010/0161805 A1 * 6/2010 Yoshizawa et al. ........... 709/226
2010/0229169 A1 * 9/2010 Bunnell et al. .................... 718/1
2010/0299187 A1 * 11/2010 Duggal ........................ 705/14.1
2011/0153716 A1 * 6/2011 Malakapalli et al. ......... 709/203
2012/0036178 A1 * 2/2012 Gavini et al. ................. 709/203
2012/0066681 A1 * 3/2012 Levy et al. ......................... 718/1
2012/0079596 A1 * 3/2012 Thomas et al. ................. 726/24
2012/0174096 A1 * 7/2012 Conover ............................ 718/1
2012/0239729 A1 * 9/2012 Hefter .......................... 709/203
2012/0243531 A1 9/2012 Meer
2012/0297176 A1 * 11/2012 Bhargava et al. ................ 713/1
2013/0042000 A1 * 2/2013 Machida ....................... 709/224
2013/0212581 A1 * 8/2013 Edwards et al. .................. 718/1
2013/0247045 A1 * 9/2013 Fitzgerald et al. ................ 718/1
2013/0283181 A1 * 10/2013 Mazzaferri ................... 715/740

FOREIGN PATENT DOCUMENTS

WO WO2007027658 3/2007

OTHER PUBLICATIONS

Cisco ACE 4700 Series Application Control Engine Appliances, available from http://www.cisco.com/en/US/prod/collateral/contnetw/ps5719/ps7027/product_bulletin_c25-478675.html.

(Continued)

*Primary Examiner* — Bunjob Jaroenchonwanit

(57) ABSTRACT

Systems and methods of identifying users of remote sessions are disclosed. In an example, a method includes establishing a remote session in a virtual machine. The method also includes identifying a user of the remote session. The method also includes identifying information of the user in an outgoing request by the virtual machine for access to an application on a backend server during the remote session.

20 Claims, 4 Drawing Sheets

400

Establish Remote Session — 410

Identify User Of Remote Session — 420

Identify Information Of User In Outgoing Request During Remote Session — 430

(56) References Cited

OTHER PUBLICATIONS

NComputing IP Utility (NIU) for vSpaceTM, available from http://saavycomputex.com/?page__id=124&file=File-1282054308.pdf&fname=NIU%20SW%20Datasheet.pdf.

Apache Module Mod__Proxy, available from http://httpd.apache.org/docs/2.2/mod/mod__proxy.html.

Add Http Header of Server IP Address? available from http://devcentral.f5.com/Community/GroupDetails/tabid/1082223/asg/50/afv/topic/aft/1174746/aff/5/showtab/groupforums/Default.aspx.

* cited by examiner 100
140
Identification Service
142
144
150
Identification Agent
120
Data Center
121
122
123
124
125
110
Network
130
Client
User
131
132
133

300
310
Original Request
311
Header
312
Body
150
Identification Agent
330
Request Modifier
340
Query Engine
350
351
Client ID
352
Other Client Info
320
Modified Request
321
Modified Header
322
Alt Header
323
Body

IDENTIFYING USERS OF REMOTE SESSIONS

BACKGROUND

Modern data centers and online computing resources offer a consolidated environment for maintaining, and upgrading hardware and software, while providing convenient remote access from any location that has network access. Data centers may be used to provide so-called "cloud computing" resources for enterprises and to the public at large. Many cloud computing resources can be accessed by users, regardless of their physical location, using a relatively straightforward and easy-to-use web-browser. Cloud computing enables users to always have access to the most recent resources (e.g., the most recent software applications), without having to constantly update and maintain their own systems.

It is common practice in the cloud computing environment that the users are not given direct access to software applications from their desktop machine. Instead, the user connects to an intermediary server (a so-called "virtual server"). The virtual server handles connections with the users by establishing remote sessions which provide a so-called "virtual machine" with a "virtual desktop" for the user. The virtual server also provides the user with access to backend servers where the software applications are stored and executed (also referred to as the "application server").

Users of the remote session can access software applications on the backend servers via the virtual server using their virtual desktop. When the user makes a request from their virtual desktop to access a software application on the backend servers, the request is handled by the virtual server. As such, the backend server does not know the identity of the actual user requesting access to the software application.

DETAILED DESCRIPTION

Figure 1:
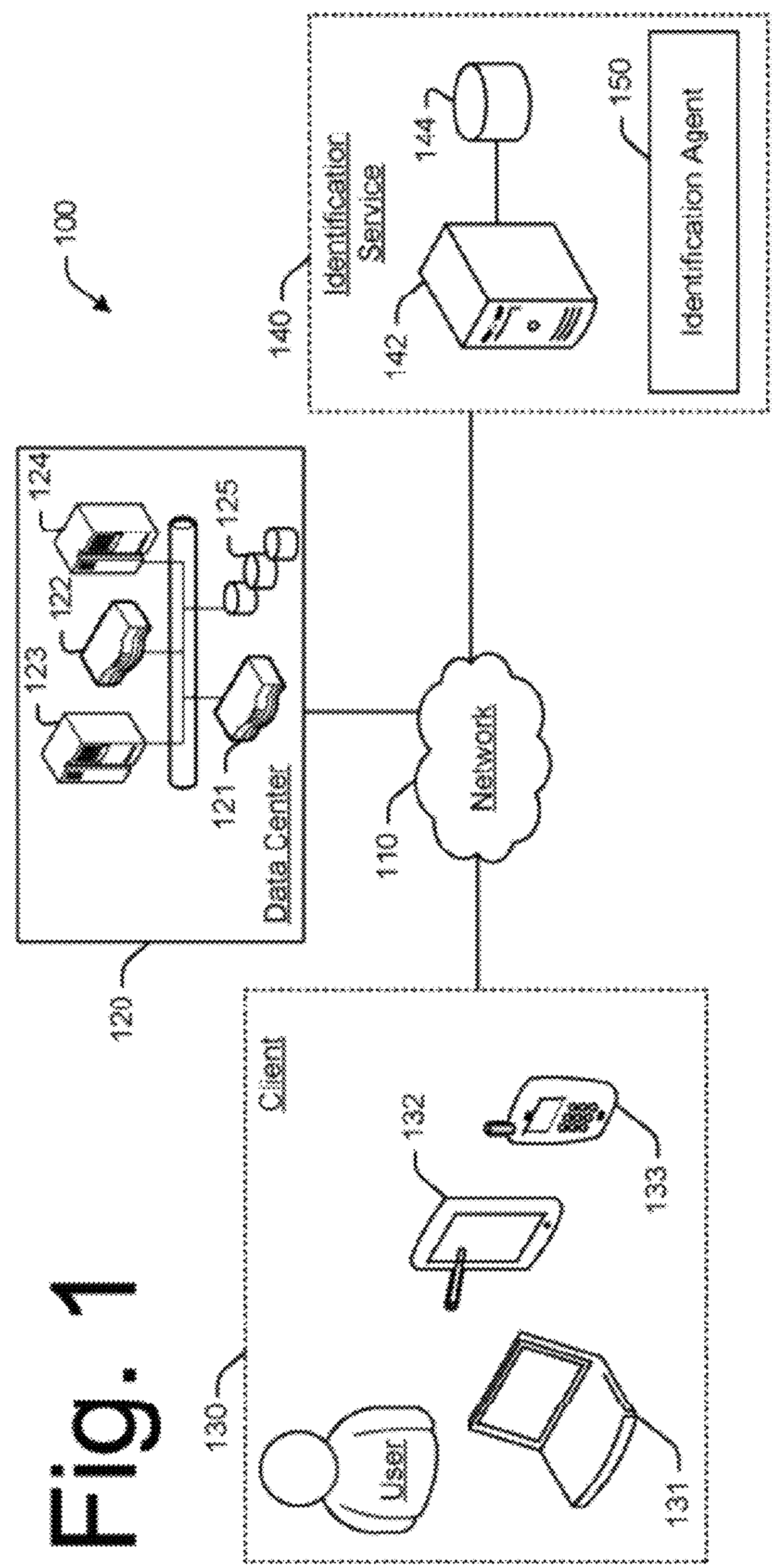
FIG. 1 is a high-level illustration of an exemplary networked computer system which may be implemented for identifying users of remote sessions.

Systems and methods are disclosed which identify users of remote sessions. The systems and methods are applicable to data centers used to provide computing resources for enterprises and to the public at large (e.g., "cloud computing" environments).

Users in cloud computing environment may not be given direct access to software applications. Instead, the user connects to an virtual server which provides access to the backend servers hosting the software applications. In prior systems, when the user made a request from a virtual machine using their virtual desktop to access a software application on the backend servers via the virtual server, the backend servers did not know the identity of the actual user. The identity was masked by the virtual server. An example is shown in the following Table 1.

TABLE 1

Example Of Masking User Identification During Remote Session

| Request URL | Client IP | Username |
|---|---|---|
| /index.html | 60.62.2.2 | — |
| /index.html | 60.62.2.2 | — |
| /search?q=agent | 60.62.2.2 | — |
| /checkout.jsp | 60.62.2.2 | — |
| /index.html | 60.62.2.2 | — |
| /view?item=agent | | |

Systems and methods described herein, however, establish a remote session with a virtual machine, identify a user of the remote session, and include the identifying information of the user in an outgoing request by the virtual machine for access to a software application during the remote session. An example is shown in the following Table 2.

TABLE 2

Example Showing User Identification During Remote Session

| Request URL | Client IP | Username |
|---|---|---|
| /index.html | 121.54.10.4 | John |
| /index.html | 59.64.8.1 | Rosetta |
| /search?q=agent | 121.54.10.4 | John |
| /checkout.jsp | 59.64.8.1 | Rosetta |
| /index.html | 59.64.7.2 | Steve |
| /view?item=agent | 121.54.10.4 | John |

In an example, the identification agent intercepts an outgoing request by the virtual machine for access to the software application on the backend servers. The identification agent identifies the user of the remote session by an identification agent for the virtual machine before including the identifying information of the user in the outgoing request.

Examples of identifying the user of the remote session to the backend servers may include creating a registry key, adding an IP address and username for the user to an existing HTTP header, or in a separate HTTP header for the outgoing request. Other examples may include adding an IP address and username for the user to a User-Agent header value for the outgoing request. Other information for identifying the user for the virtual server may also be provided instead of, or in addition to the IP address and username for the remote session. For example, connection time of the user, duration of remote session, frequency of connections, and/or capabilities of the client may also be included.

As such, the systems and methods described herein enrich outgoing request(s) by the virtual machine for access to the application. The user information for the remote session may be used by the backend servers to enhance the user experience and/or for security purposes, among other examples. Embodying the identification service as an agent enables implementation in existing cloud computing environments with few if any changes to the existing hardware and software architectures of the data center.

FIG. 1 is a high-level illustration of an exemplary networked computer system 100 which may be implemented for identifying users of remote sessions. The networked computer system 100 may include one or more communication networks 110 (such as a local area network (LAN) and/or wide area network (WAN)) providing access to a data center 120.

Data center 120 may be any size (e.g., a single server or a multi-resource system) and may be housed at a single facility, or distributed across multiple facilities. Data center 120 provides access to resources by users at different locations via the network 110.

Regardless of the physical location of a data center, communications in data centers are typically network-based. The most common communications protocol is the Internet protocol (IP), however, other network communications protocols (or combinations of protocols) may be used. The data center 120 may be connected by routers 121 and switches 122 and/or other network communications devices that move network traffic between the servers 123, 124, storage devices 125, and/or other resources in the data center 120. The network devices may also make connections with the network 110 to provide external access to the resources of the data center 120.

Some of the resources in the data center 120 are used for basic communications services (both with internal and external entities), such as email servers, proxy services, etc. Both on-site and off-site security and monitoring resources may also be deployed as part of the data center 120. The data center 120 may also include physical security and environmental (e.g., cooling) components.

The main purpose of the data center 120 is providing clients) 130 access to the resources, including but not limited to software applications hosted by the backend servers 123 and 124. Providing the client(s) 130 access to the resources in the data center 120 may also include provisioning of the resources, e.g., via file servers, virtual servers, and the associated middleware.

The terms "client" and "clients" 130 as used herein refer to a computing device through which user(s) may access resources in the data center 120. Client machine or computing devices 131-133 may include any of a wide variety of computing systems, such as a stand-alone personal desktop or laptop computer (PC), workstation, personal digital assistant (PDA), or appliance, to name only a few examples. Each of the client machines 131-133 may include memory, storage, and a degree of data processing capability at least sufficient to manage a connection to the network 110 either directly or indirectly. Client machines may connect to network 110 via any suitable network communication protocol, such as via an Internet service provider (ISP).

The user(s) may include anybody (or any entity) desiring access as a client 130 to resource(s) in the data center 120. For purposes of illustration, the user may be an engineer at an enterprise. The engineer may access the applications and other resources (e.g., data processing) in the data center 120 for a large-scale data analysis project. In another illustration, the user may be a backup server in an enterprise. The backup server accesses a backup application on the backend servers 123 and 124 to backup data for the enterprise in storage subsystem 125 in the data center 120. In yet another illustration, the user may be an Internet user who accesses an ecommerce website via the Internet, which is hosted on backend servers 123 and 124 in the data center 120.

The data center 120 may include an virtual server 142. Although shown as a separate entity in FIG. 1, it is noted that virtual server 142 having computer-readable storage 144 may be part of the data center 120.

The virtual server 142 establishes a virtual machine for the user during a remote session. The virtual machine provides the user with a virtual desktop (e.g., displaying icons for the user) which links to software applications hosted on the backend servers 123 and 124. When the user selects a link on the virtual desktop to a software application, the user's client machine sends a request to the virtual server 142. The virtual server 142 then directs the request to the appropriate backend server (i.e., the backend server 123 or 124 hosting the target software application). The virtual server 142 also receives a response to the request from the appropriate backend server. The virtual server 142 provides this response to the user's client machine 131-133 as part of the remote session.

As such, it appears to the user that the user is accessing the software application directly (e.g., on the client machine). However, the request received by the backend server appears to be from the virtual server 142, and therefore the identity of the user at the client machine is masked in the request.

For purposes of illustration, the client machine 131-133 may have an IP address of 1.2.3.4. The user connects to the virtual server 142 using the client machine's 131-133 real IP address 1.2.3.4, and the virtual server 142 establishes a remote session with the user. The virtual server 142 has an IP address 10.11.12.13. During the remote session, the user may request to use a software application on one of the backend servers 123 or 124. The virtual server 142 actually accesses the software application from the appropriate backend server on behalf of the user. Accordingly, the backend server only sees the virtual server's IP address 10.11.12.13. The user's real IP address (1.2.3.4) is masked.

In order to identify the actual user to the backend server, the virtual server 142 may utilize an identification service 140. The identification service 140 may be implemented in the networked computer system 100 using any suitable computing system, including for example the virtual server 142 having computer-readable storage 144. In any event, the identification service 140 is at least communicatively coupled with the intermediary or virtual machine, and hence the data center 120. The identification service 140 may execute an identification agent 150 implemented in machine readable instructions (e.g., software or other program code).

The identification service 140 may be better understood with reference to the illustration described below with reference to FIG. 2.

Figure 2:
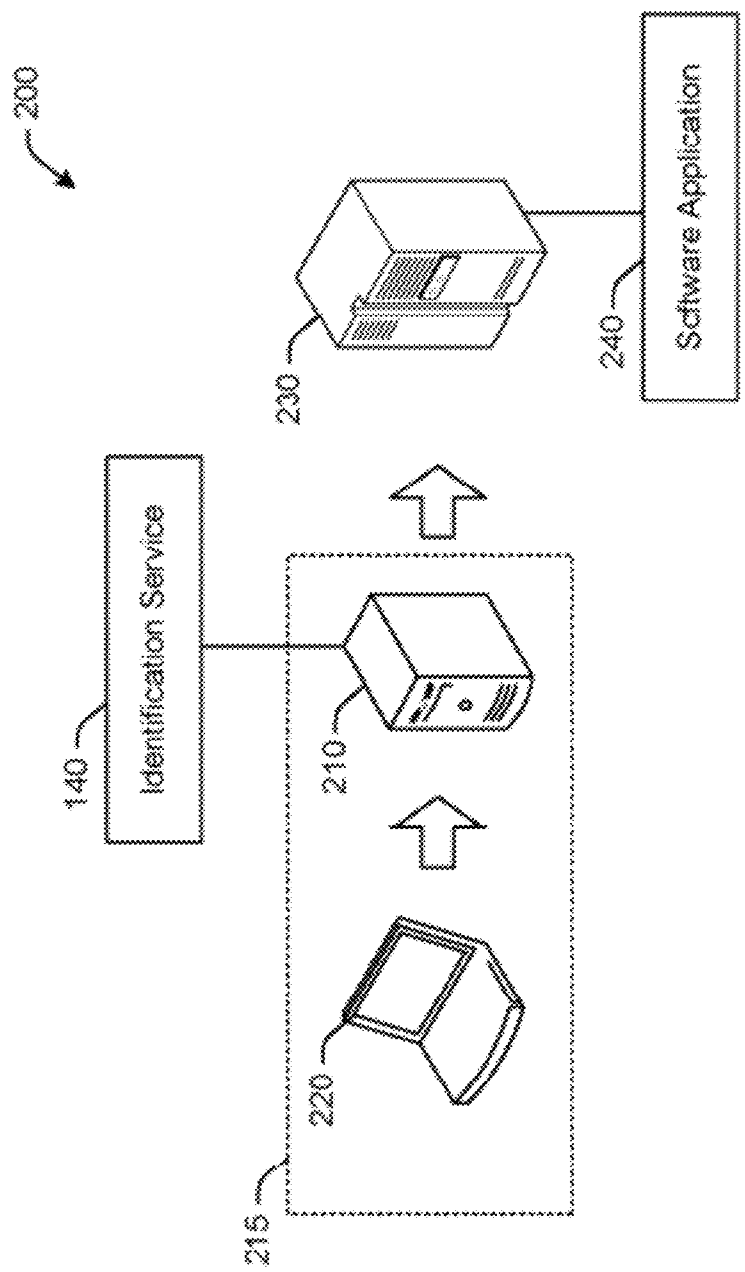
FIG. 2 is an illustration showing an example identification service on an virtual server identifying users of a remote session to a backend server.

FIG. 2 is an illustration 200 of virtual server 210 which has established a remote session with client machine 220. As part of the remote session, the client machine 220 operates in conjunction with the virtual server 210 as a virtual machine (represented by box 215). The user may be provided with a virtual desktop as part of the virtual machine 215.

The virtual server 210 receives and stores information about the client machine 220, for example, in a database or other data structure. It is noted that the term "receive" includes accessing or actively getting/obtaining and/or passively receiving. In an example, the virtual server 210 receives and stores this information as part of establishing the remote session. Information may include a user name and IP address for the client machine 220. Other information may include a device ID and capabilities of the client machine 220.

The virtual server 210 may be communicatively coupled with a backend server 230 hosting a software application 240. In this example, the virtual server 210 and backend server 230 are both resident in a data center.

The identification service 140 may be installed on the virtual server 210. The identification service 140 receives requests from the client machine 220 for access to the software application 240. It is noted that although the example given here is for access to a software application, in other examples a request may be made by the user via the virtual machine 215 to access other software and/or hardware resources in the data center (e.g., a storage subsystem).

The identification service 140 intercepts (or passively reads) requests made by the client machine 220 to the virtual server 210 during the remote session. In an example, the identification service 140 may intercept request(s) on an ongoing basis. In another example, the identification service 140 may only intercept selected requests, such as an initial request to access the software application 240.

The identification service 140 associates the request with a particular client machine 220. The identification service 140 may also retrieve the identification information for the client machine 220. For example, the identification service 140 may access the database (or other data structure) to retrieve the identification information that was stored by the virtual server 210 when the remote session was established. In another example, the identification service 140 may retrieve identification information for the client machine 220 in real-time, or substantially in real-time, (e.g., by issuing a ping to the client machine 220).

The identification service 140 may only need to retrieve identification information for the client machine 220 once when the client machine 220 first requests access to the software application 240. The identification service 140 may then associate this information with all requests by the client machine 220 for the software application 240. Accordingly, the requests arriving at the backend server 230 include information identifying the actual user of client machine 220.

The type of information that the identification service 140 associates with the request may vary based on the type of resource being accessed. For example, information for accessing an unsecure software application such as a word processor may only include the IP address and username of the client machine 220. But in other examples, more information may need to be provided for accessing a secure software application or other resource. For purposes of illustration, requests to access a secure database for the human resources department of an enterprise may need to be associated with a user password for the client machine 220. Still for purposes of illustration, requests to access a storage subsystem may need to be associated with configuration and corresponding capabilities (firmware versions, drivers, logical and physical connections) for the client machine 220. Any type of information for client machine 220 may be associated with the requests to access software application 240 on backend server 230 or other resources in the data center.

The identification service 140 may associate the identifying information for a user of the remote session with a request to access the software application 240 or other resource in any suitable manner. In an example, the identification service 140 includes the identifying information in a request by creating a registry key, adding an IP address and username for the user to an existing HTTP header, or in a separate HTTP header for the outgoing request. Other examples may include adding an IP address and username to a User-Agent header value for the request.

Figure 3:
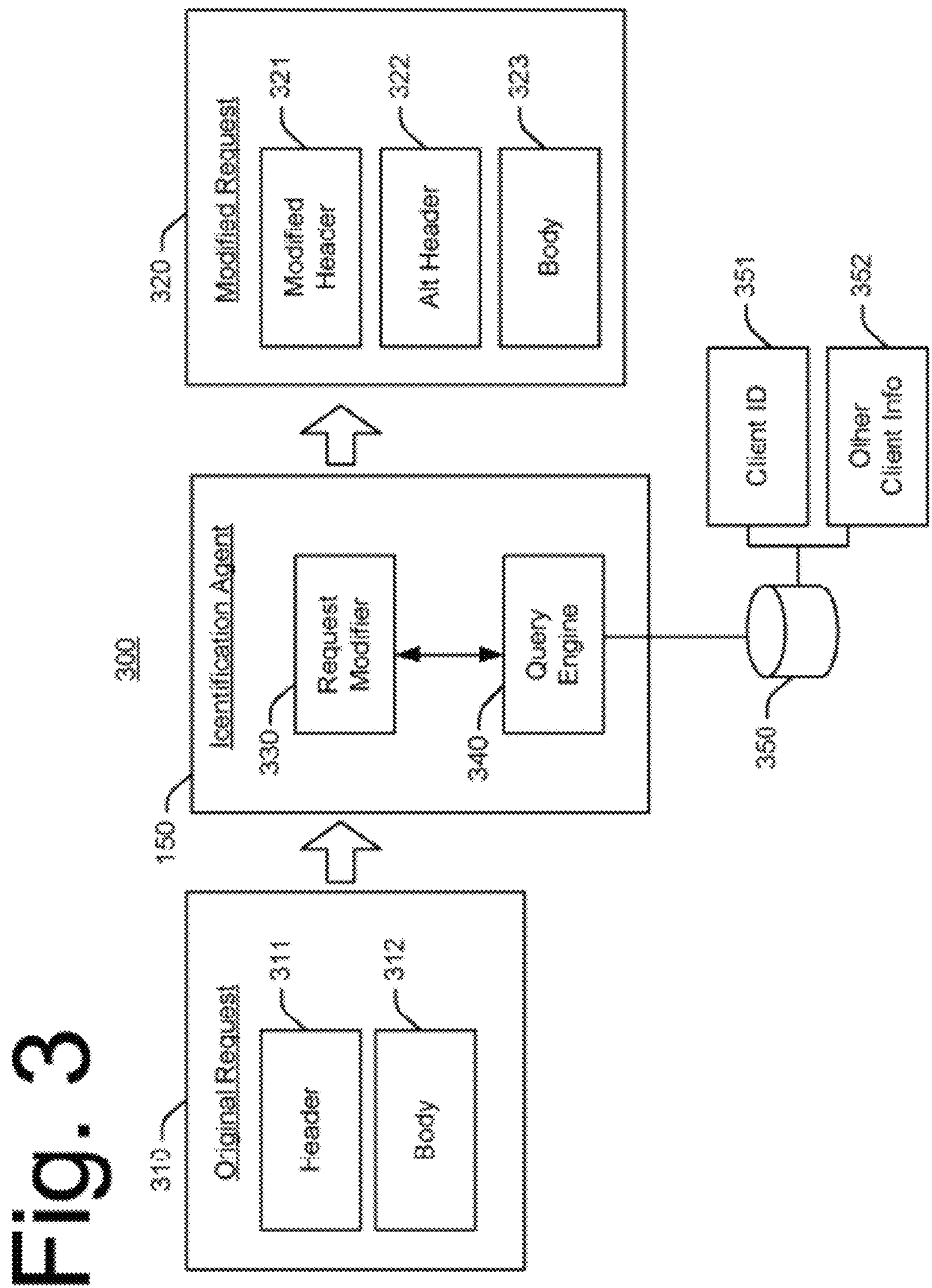
FIG. 3 shows an example architecture of machine readable instructions which may be executed to identify users of a remote session.

FIG. 3 shows an example architecture 300 of machine readable instructions which may be executed to identify users of remote sessions. The machine readable instructions (such as but not limited to, software or firmware) may be stored on a computer readable medium (or media) and executed by processor(s) for the identification service 140 (FIGS. 1 and 2) to perform the operations described herein. In an example, the machine readable instructions may be embodied as an identification agent 150. It is noted, however, that the components shown in the figures are provided only for purposes of illustration of an example operating environment, and are not intended to limit execution to any particular computing system.

In the example shown in FIG. 3, identification agent 150 may perform the function of the architecture of machine readable instructions as self-contained modules. These modules can be integrated within a self-standing tool, or may be implemented as agents that run on top of an existing database.

As shown in FIG. 3, the identification agent 150 intercepts a request 310 to access a resource in the data center. For example, the request 310 may be for a software application hosted by a backend server in the data center (as discussed above with reference to the illustration in FIG. 2). The request 310 may include a header 311 and a body 312. The header 311 identifies the target (e.g., the software application) and the body may include instructions (e.g., start the software application or execute a command using the software application) and/or data (e.g., data to be operated on by the software application).

The identification agent 150 determines the identity of the client machine making the request 310, and injects the identity of the client machine into the original request 310 to create a modified request 320. To enable these operations, the identification agent 150 may include a request modifier module 330 operatively associated by a query engine 340 with a database 350 including the client ID 351 and other client information 352.

The client ID 351 may include, but is not limited to an IP address and username of the user of the client machine (or the remote session ID). Other client information 352 may include, but is not limited to, connection time of the remote session, duration of the remote session, frequency of connections, and/or capabilities of the client machine.

This information may be stored in database 350, which may be provided on the same or different computer readable medium where the identification agent 150 resides. The database 350 may be populated with the client ID 351 and other client information 352 when the client machine establishes a remote session. The database 350 may be populated with this information at any time after the client machine establishes a remote session. For example, the database 350 may be populated when the client machine makes a first request to access a software application from a backend server, or for access to another resource in the data center.

The identification agent 150 may interface with the database 350 via a query engine 340. Of course, the request modifier module 330 may be integrated into the query engine 340. In an example, the request modifier module 330 is an SQL-based stream engine, and the query engine 340 is thus an SQL query engine. However, other examples are also contemplated.

In any event, after retrieving the client ID 351 and/or other client information 352, the identification agent modifies the original request 310 and outputs a modified request 320. The modified request 320 may include a modified header 321 with the identification information. For example, the request modifier module 330 may add an IP address and username for the user to an existing header 311.

The modified request 320 may also include an alternate header 322. For example, the request modifier module 330 may create a registry key including the identification information, or embed, the identification information in a separate HTTP header for the outgoing or modified request 320. Other examples may include adding an IP address and username to a User-Agent header value in the outgoing or modified request 320.

The modified request 320 may also include the body 323 of the request. In an example, the body 323 of the modified request 320 remains unchanged from the body 312 of the original request 310. In other examples, however, the identification agent 150 may also modify the body 323.

It is noted that the functional modules and components of the requests shown in FIG. 3 are only provided for purposes of illustration, and are not intended to be limiting in any manner. Still other functions and functional modules may also be provided. Likewise, the request does not need to take any predefined form. In addition, the functions and functional modules, and components of the requests may be combined with one another or used independently of one another.

Before continuing, it is noted that the components depicted in the figures corresponding to the systems described above are merely exemplary of various configurations which may be implemented for identifying users of remote sessions. However, the systems described herein are not limited to any specific components or configuration of those components. Still other embodiments are also contemplated, as will be readily understood by those having ordinary skill in the art after becoming familiar with the teachings herein.

Figure 4:
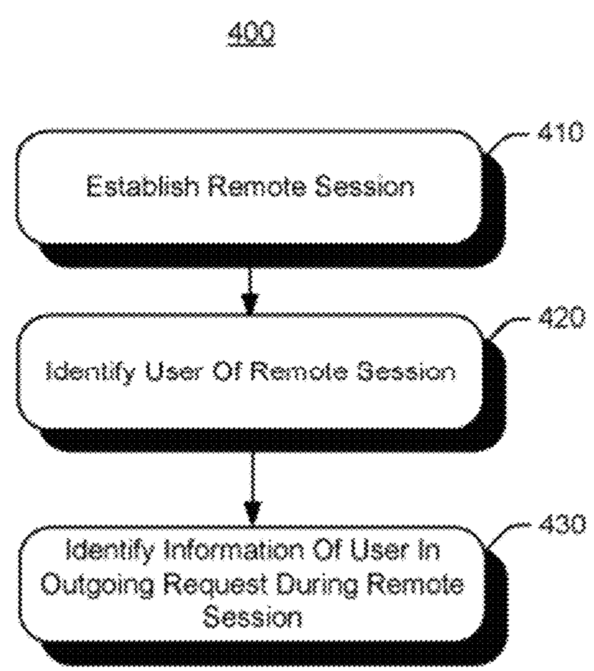
FIG. 4 is a flowchart illustrating exemplary operations which may be implemented for identifying users of remote sessions.

FIG. 4 is a flowchart illustrating exemplary operations which may be implemented for identifying users of remote sessions. Operations 400 may be embodied as logic instructions on one or more computer-readable medium. The computer-readable medium is inclusive of system memory (memory on which the program is installed) as well as portable or remote memory that stores installation files for the program). Thus, program code includes both the installed application and the installation files. When executed on a processor, the logic instructions cause a general purpose computing device to be programmed as a special-purpose machine that implements the described operations. In an exemplary implementation, the components and connections depicted in the figures may be used for identifying users of remote sessions.

In operation 410, a remote session is established in a virtual machine. For example, a client may connect to an virtual server and establish a remote session. The virtual server may present the user with a virtual desktop as part of the remote session.

In operation 420, a user of the remote session is identified. In an example, identifying the user of the remote session is by an identification agent for the virtual machine. The virtual machine may intercept the request for access to the application before including the identifying information of the user in the outgoing request.

In operation 430, identifying information of the user is included in an outgoing request by the virtual machine for access to a software application during the remote session. For example, an identification agent may intercept a request to access the software application on the backend server. The identification agent may add or otherwise modify the request to include information identifying the user (and/or other information) so that the backend server receiving the request knows the actual identity (and/or other information) of the user.

The operations shown and described herein are provided to illustrate exemplary implementations. It is noted that the operations are not limited to the ordering shown. Still other operations may also be implemented.

For purposes of illustration, further operations may also include creating a registry key for including the identifying information of the user in the outgoing request. Further operations may also include adding an IP address and username for the user to an existing HTTP header for the outgoing request. In another example, further operations may include adding an IP address and username for the user in a separate HTTP header for the outgoing request. Further operations may also include adding an IP address and username for the user to a User-Agent header value for the outgoing request.

Still further operations may include querying the remote session for the identifying information of the user. Further operations may also include enriching the outgoing request by the virtual machine for access to the application. For example, enriching the outgoing request may include adding user information identifying the actual or "real" user of the resource so that responses can be tailored for the actual user and/or security can be checked.

It is noted that the exemplary embodiments shown and described are provided for purposes of illustration and are not intended to be limiting. Still other embodiments are also contemplated.

The invention claimed is:

1. A method of identifying a user of a remote session, comprising:
- establishing a remote session in a virtual machine;
- identifying a user of the remote session at the virtual machine;
- creating a registry key at the virtual machine, the registry key including the identifying information of the user in the outgoing request; and
- including identifying information of the user in an outgoing request by the virtual machine for access to an application on a backend server during the remote session.

2. The method of claim 1, wherein identifying the user of the remote session is by an identification agent for the virtual machine.

3. The method of claim 1, wherein including comprises adding an IP address and username for the user to an existing Hypertext Transfer Protocol (HTTP) header for the outgoing request.

4. The method of claim 1, wherein including comprises including an IP address and username for the user in a separate Hypertext Transfer Protocol (HTTP) header for the outgoing request.

5. The method of claim 1, wherein including comprises adding an IP address and username for the user to a User-Agent header value for the outgoing request.

6. The method of claim 1, further comprising querying the remote session for the identifying information of the user.

7. The method of claim 1, further comprising intercepting the outgoing request by the virtual machine for access to the application before including the identifying information of the user in the outgoing request.

8. The method of claim 1, further comprising enriching the outgoing request by the virtual machine for access to the application.

9. The method of claim 1, further comprising only intercepting selected requests.

10. The method of claim 1, wherein the identifying information included in the outgoing request by the virtual machine, further includes configuration and corresponding capabilities of a client machine.

11. A non-transitory computer readable medium having program code stored thereon for identifying a user of a remote session by:
- identifying a user of a remote session;
- creating a registry key for including identifying information of the user in an outgoing request from a virtual machine hosting the remote session; and
- including identifying information for the user of the remote session in the outgoing request from the virtual machine hosting the remote session for access to an application on a backend server.

12. The program of claim 11 further identifying the user of the remote session by an identification agent for the virtual machine.

13. The program of claim 11 wherein including comprises adding an Internet Protocol (IP) address and username for the user to an existing Hypertext Transfer Protocol (HTTP) header for the outgoing request.

14. The program of claim 11 wherein including comprises including an IP address and username for the user in a separate Hypertext Transfer Protocol (HTTP) header for the outgoing request.

15. The program of claim 11 wherein including comprises adding an IP address and username for the user to a User-Agent header value for the outgoing request.

16. The program of claim 11 further querying, the remote session for the identifying information of the user.

17. The program of claim 11 further intercepting the outgoing request by the virtual machine for access to the application before enriching the outgoing request with the identifying information of the user.

18. A system comprising a memory storing program instructions and a processor configured to execute the instructions to implement a query engine and a request modifier, wherein:

the query engine accesses identifying information for a user of a remote session;

a registry key, added by a virtual machine, includes the identifying information in the outgoing request; and the request modifier includes the identifying information from the registry key in an outgoing request from a virtual machine hosting the remote session for access to an application on a backend server.

19. The system of claim 18, wherein the identifying information is one or more of a user name and an IP address.

20. The system of claim 18 wherein the request modifier is configured to include the identifying information by one of:

adding the identifying information to an existing Hypertext Transfer Protocol (HTTP) header for the outgoing request;

adding the identifying information to a separate HTTP header for the outgoing request; and adding the identifying information to a User-Agent header value for the outgoing request.

* * * * *

UNITED STATES PATENT AND TRADEMARK OFFICE

CERTIFICATE OF CORRECTION

PATENT NO. : 8,713,088 B2
APPLICATION NO. : 13/072724
DATED : April 29, 2014
INVENTOR(S) : Michael Gopshtein et al.

It is certified that error appears in the above-identified patent and that said Letters Patent is hereby corrected as shown below:

In the Claims

In column 9, line 8, in Claim 16, delete “querying,” and insert -- querying --, therefor.

Signed and Sealed this
Tenth Day of February, 2015

Michelle K. Lee

Michelle K. Lee
*Deputy Director of the United States Patent and Trademark Office*